July 3, 1928.
A. L. FISHER
CONTROL FOR AIRCRAFT
Filed Aug. 31, 1925
1,675,928
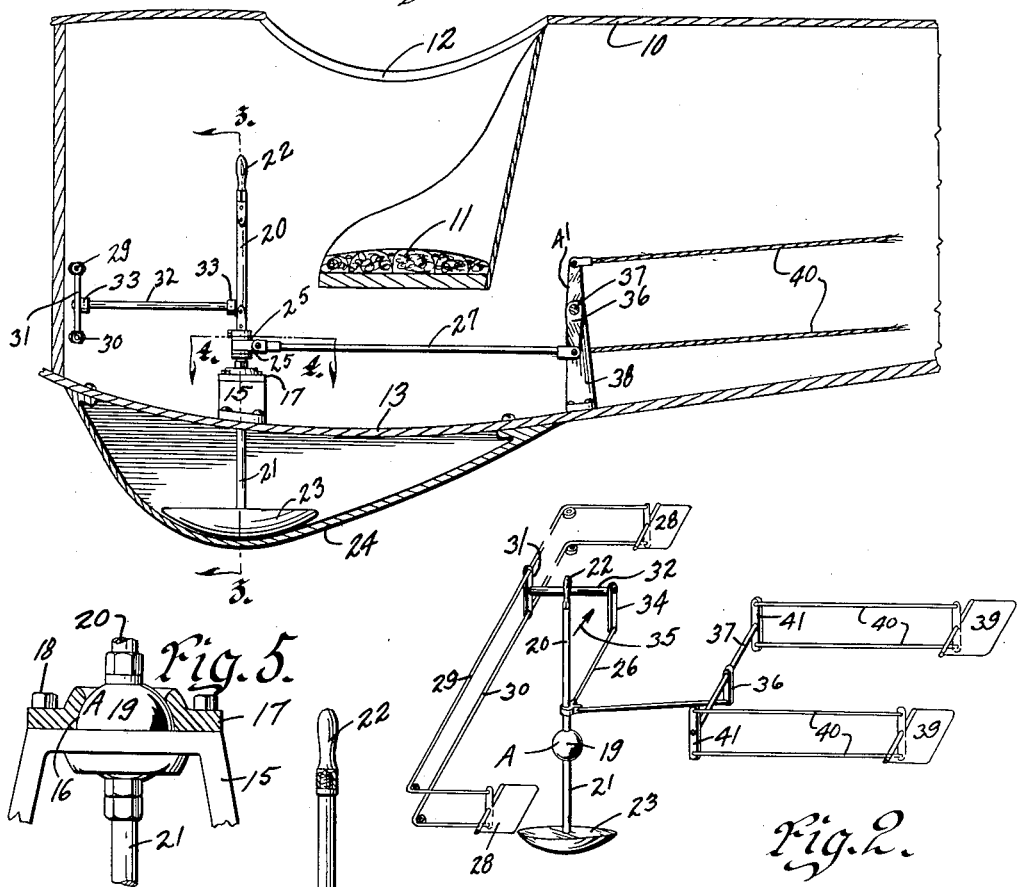
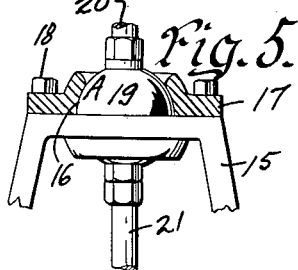
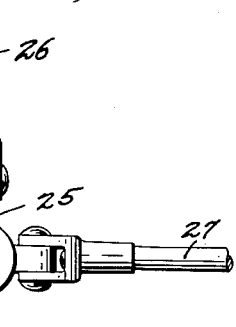
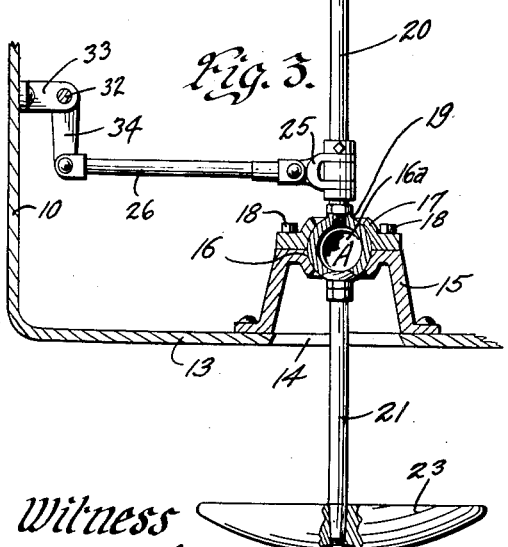
Witness
R. O. Fisher
Inventor
Alfred Leroy Fisher
by Bair & Freeman Attorneys Patented July 3, 1928.

UNITED STATES PATENT OFFICE.

ALFRED LEROY FISHER, OF YALE, IOWA.

CONTROL FOR AIRCRAFT.

Application filed August 31, 1925. Serial No. 53,617.

The object of my invention is to provide a very simple, single control for air crafts wherein a minimum of operable parts are necessary for controlling the ailerons and the elevators of the air craft, where a gravity control is used.

It may be here mentioned that in connection with controls for air crafts or ships many cables are employed, owing to the nature and construction of air crafts, and it is my object to reduce the number of cables to a very minimum, when using a control stick with a stabilizer forming a part thereof.

Still a further object is to provide a control stick mounted upon and supported by a ball and socket joint, and having a weight at its lower end to which control stick are fastened the operating rods for the ailerons and elevators whereby the control stick will act as a single unit in connection with the operation of the ailerons and the elevators, and will tend to right the position of the air ship even though not actually controlled by the operator, due to the weighted end of the control stick and socket connection thereof.

Still a further object is to provide a mounting for air ship control sticks, wherein the control stick will tend to always remain in a normal flying position, and when parts of the air ship are moved to any position outside the ordinary normal position, then there will be a tendency on the part of the control stick to regain or resume its normal flying position and will operate the controls of the air ship so that the air ship assumes a normal flying position.

Still a further object is to provide a mounting for the control stick wherein the control stick is free to move and is very sensitive so that the air ship controls may be easily operated, either manually or automatically by force of gravity of centrifugal action.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a sectional view through a portion of the fuselage of an air plane, showing the cock pit, pilot's seat and my control mechanism.

Figure 2 is a diagrammatic view showing my control and its hook up with the ailerons and elevators or controls.

Figure 3 is a sectional view taken on line 3—3 of Figure 1, parts being broken away to better illustrate the construction.

Figure 4 is a sectional view taken on the line 4—4 of Figure 1, showing the connection of the aileron and elevator controls with the control stick; and Figure 5 is a detail view of the ball and socket joint of the control stick.

In the accompanying drawings, I have used the reference numeral 10 to indicate generally the fuselage of an air plane or air ship, and 11 the pilot's seat arranged in the cock pit 12 of the ship.

The floor 13 of the cock pit 12 is formed with an opening 14, the purpose of which will be hereinafter more fully set forth.

Mounted upon the floor 13 above the opening 14 is a bearing 15 having a ball shaped socket 16 therein, a bearing cap 17, having a similar socket 16$^a$, is mounted upon the bearings 15, and may be connected thereto by bolts 18. The two sockets 16 and 16$^a$ form an opening substantially ball shaped and have their upper and lower portions formed with openings through which the control stick extends as hereinafter set forth.

Mounted within the socket formed by the sockets 16 and 16$^a$ is a ball shaped member 19 having a control stick 20 suitably secured thereto, and extending upwardly therefrom through the opening in the member 17, and a control stick 21 connected thereto and extending downwardly therefrom, and extending through an opening formed in the socket member 16.

The control sticks 20 and 21 are in alignment with each other and are so arranged as though made of a single piece of material and extended through the ball shaped member 19. The motion of the control stick is practically unlimited, the sockets 16 and 16$^a$ being only of such size as to retain the ball shaped member 19 in its socket.

Secured to the lower end of the stick 21 is a weight 23 of some size, having its undersurface curved and having its upper surface substantially flat.

The weight 23 extends below the floor 13 and may be encased in a shield or casing 24 of any suitable kind, which is fastened to the floor 13.

It will be noted that by the ball and socket connections generally referred to by the reference character A, I am able to swing the control stick 20 in any universal direction.

The weight 23 tends to hold the control stick in its normal flying position.

Fixed to the control stick 20 in any suitable manner is a collar 25 to which is pivotally connected a pair of control rods 26 and 27.

The control rod 26 is adapted to control the ailerons 28 and the control rod 27 is for operating the elevators 39.

The ailerons are connected together by suitable cables 29 and 30.

The cables 29 and 30 have fixed to them an arm 31, which is mounted upon a shaft 32. The shaft 32 is journalled in bearings 33 mounted upon the fuselage of the air craft, and is of such length as to place the cables 29 and 30 a sufficient distance forward of the control stick so as not to interfere with the feet of the operator. A short arm or lever 34 is fixed to the free end of the shaft 32, and has its other end loosely or pivotally connected to the control rod 26.

Movement of the controls 26 in the direction indicated by the arrow 35 will cause the ailerons on the opposite sides of the air craft to move simultaneously in opposite directions.

The control rod 27 extends rearwardly from the control stick 20 and is fixed to a short arm or lever 36, which has its upper end fixed to a transverse shaft 37. The shaft 37 is mounted in suitable bearings 38.

At the outer ends of the shaft 37 are levers 41 which are operatively connected with the elevators 39 by cables 40.

It may be here mentioned that any type of hook up between the levers 41 and the elevators 39 may be employed depending upon the particular type of elevators or ship. The some is true with the type of hook up between the arm 31 and the ailerons 28.

The control stick 20, when moved in the direction indicated by the arrow 35, will not interfere with the position of the control rod 27 due to the pivotal connections of the control rod 27 with the collar 25, and with the lever 36.

Movement of the control stick so as to effect a movement of the elevators may be had without effecting the position of the ailerons, due to the loose or pivotal connection of the control rod 26.

The lower portions of the control mechanism mounted in the cock pit may be housed in a casing so as not to interfere with the operator of the air craft or ship.

*Practical operation*

In operation, the control stick may be used in the ordinary manner. The pilot, having complete control of the control stick at all times.

By having this ball joint with the upper and lower portions cut away to allow a universal movement of the control stick, it permits the whole to work as one part. It eliminates the need of cables below the axis of the control stick and the parts related to those cables; the use of gear or cog-wheels, or any manner of ratchet. These eliminations reduce weight, friction, and the energy required to operate a gravity controlled ship. Any position the ship may acquire that is not level or not a perfect "bank" would cause the weight on the lower end of the control stick by force of gravity, or centrifugal force, to exert its force on the control stick in the manner required to bring the ship to a level, or a normal position in "banking" for a turn. It would tend to keep the pilot from over-controlling ship.

As an example of the above statements,— if the ship were flying in a given direction and the pilot, desiring to turn to the left, (it is assumed that the ship is level) operates the rudder so as to cause the ship to make a left turn, but does not operate the control stick to place the ship in a bank, the result would be skidding caused by centrifugal force. However, with the weight attached to the lower end of the control stick, centrifugal force would cause this weight to swing in an outward manner, or to the right. This would move the upper part of the control stick to the left, thereby operating the ailerons in the manner required to place the ship in a perfect bank. At the instant the ship acquired a perfect bank, the weight would cease to exert any force upon the control stick, excepting in the manner it exerts when the ship is level.

As another example,—if the pilot so operated the control stick, in making a turn, so as to place the ship too near a vertical bank in regard to speed and the length of the turn, the result would be "side-slipping", caused by force of gravity, then, gravity acting upon the weight suspended on the lower end of the control stick would cause the upper end of the control stick to move in an upward manner, thereby operating the ailerons in the manner required to bring the ship to a perfect banking position.

Some changes may be made in the construction and arrangement of the various parts of my invention, without departing from the real spirit and purpose of my invention, and it is my intention to cover by my claim, any modified forms of structure or use of mechanical equivalents, which may be reasonably included within their scope.

I claim as my invention:

In combination with an air craft, a control means therefor comprising a control stick universally pivoted, a weight on the lower end thereof, a pair of rock shafts at right angles to each other and spaced from said control stick, an arm on each rock shaft, a pair of yokes each pivoted to one of said arms, a second pair of yokes, rods rotatably mounted in said second yokes and secured to the first yokes, and a pair of members rotatably mounted on said control stick, said second yokes being pivoted to said members, and means for operatively connecting the ailerons and elevators of said air craft to said rock shafts.

Des Moines, Iowa, August 26, 1925.

ALFRED LEROY FISHER.